US011021084B2

(12) United States Patent
Sakurai

(10) Patent No.: US 11,021,084 B2
(45) Date of Patent: Jun. 1, 2021

(54) VEHICLE SEAT STRUCTURE

(71) Applicant: Toyota Jidosha Kabushiki Kaisha, Toyota (JP)

(72) Inventor: Hideyuki Sakurai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/668,620

(22) Filed: Oct. 30, 2019

(65) Prior Publication Data
US 2020/0139860 A1    May 7, 2020

(30) Foreign Application Priority Data

Nov. 5, 2018  (JP) .............................. JP2018-208036

(51) Int. Cl.
| | | |
|---|---|---|
| *B64D 11/06* | (2006.01) | |
| *A47C 9/06* | (2006.01) | |
| *B60N 2/30* | (2006.01) | |
| *B60N 2/24* | (2006.01) | |

(52) U.S. Cl.
CPC .............. *B60N 2/305* (2013.01); *A47C 9/06* (2013.01); *B60N 2/242* (2013.01); *B60N 2/3027* (2013.01); *B60N 2/3047* (2013.01); *B64D 11/0698* (2014.12)

(58) Field of Classification Search
CPC ... B64D 11/0698; B64D 11/0691; A47C 9/06; A47C 1/126; B63B 2029/043; F41H 7/046
See application file for complete search history.

(56) References Cited

U.S. PATENT DOCUMENTS

| | | | | | |
|---|---|---|---|---|---|
| 1,167,453 | A | * | 1/1916 | Warren ................... | A47C 9/06 248/240.2 |
| 1,761,673 | A | * | 6/1930 | Laursen .................. | A47C 9/06 297/14 |
| 1,784,390 | A | * | 12/1930 | Rice ........................ | A47C 9/06 297/324 |
| 2,497,412 | A | * | 2/1950 | Larin ..................... | A47C 17/48 297/14 |
| 4,902,069 | A | * | 2/1990 | Lehnert ............. | B64D 11/0691 297/14 |

(Continued)

FOREIGN PATENT DOCUMENTS

| | | | |
|---|---|---|---|
| JP | H08276772 A | 10/1996 | |
| JP | 2003310386 A | * 11/2003 | .............. A47C 9/06 |

(Continued)

*Primary Examiner* — Timothy J Brindley
(74) *Attorney, Agent, or Firm* — Dinsmore & Shohl LLP

(57) ABSTRACT

A vehicle seat structure including: a seat cushion on which a vehicle occupant sits; a seat back that supports a back portion of the vehicle occupant while sitting on the seat cushion in a seat deployed state, the seat deployed state being a state in which the vehicle occupant is able to sit on the seat cushion; and a seat deploying/retracting mechanism that enables the seat cushion and the seat back to slide in a vehicle up-down direction, and that, in a seat retracted state in which the seat cushion and the seat back are retracted, enables the seat cushion and the seat back to be placed in the vehicle up-down direction such that the seat cushion stands upright, and the seat back is placed at an upper side of the seat cushion.

11 Claims, 11 Drawing Sheets

(56) References Cited

U.S. PATENT DOCUMENTS

| | | | | |
|---|---|---|---|---|
| 5,364,151 A * | 11/1994 | Yurasits | ................... | A47C 9/06 |
| | | | | 180/326 |
| 6,089,651 A * | 7/2000 | Carmen | ................. | A47C 1/126 |
| | | | | 248/501 |
| 6,896,322 B1 * | 5/2005 | Foy | ........................ | A47C 1/126 |
| | | | | 297/129 |
| 2015/0375644 A1 * | 12/2015 | Gratz | ................... | B60N 2/3093 |
| | | | | 297/316 |
| 2017/0188712 A1 * | 7/2017 | Ehlinger | ................. | A47C 4/04 |
| 2018/0155035 A1 * | 6/2018 | Spagl | ................... | B64D 11/064 |

FOREIGN PATENT DOCUMENTS

| | | | | |
|---|---|---|---|---|
| JP | 2004-142676 A | | 5/2004 | |
| JP | 3106501 U * | | 1/2005 | ............... A47C 9/06 |
| JP | 2005-075075 A | | 3/2005 | |
| WO | WO-2016030843 A1 * | | 3/2016 | ............. B60N 2/028 |

* cited by examiner

VEHICLE SEAT STRUCTURE

CROSS-REFERENCE TO RELATED APPLICATION

This application is based on and claims priority under 35 USC 119 from Japanese Patent Application No. 2018-208036, filed on Nov. 5, 2018, the disclosure of which is incorporated by reference herein.

BACKGROUND

Technical Field

The present disclosure relates to a vehicle seat structure.

Related Art

Japanese Patent Application Laid-Open (JP-A) No. 08-276772, discloses a seat that is used in a vehicle such as a train or the like. In this seat, a seating portion (hereinafter, referred to as a 'seat cushion') is supported so as to be able to pivot relative to a backrest portion (hereinafter, referred to as 'a seat back'), and in a seat retracted state, the seat cushion is placed in an upright attitude, so that the seat cushion and the seat back are set up to mutually overlap in a front-rear direction.

On the other hand, Japanese Patent Application Laid-Open (JP-A) No. 2004-142676, discloses a seat that is used in a vehicle such as an automobile or the like. In this seat, in conjunction with an operation to tilt the seat back towards the front, the seat cushion is retracted towards the rear side in a vehicle front-rear direction from the position where it is normally used, and is lowered at the same time. Further, in a seat retracted state, the seat cushion is retracted in a retracted position. In addition, Japanese Patent Application Laid-Open (JP-A) No. 2005-075075, discloses a seat in which, in a retracted state, the seat back is tilted towards the front so that the seat back is superimposed onto the seat cushion.

However, in the above-described technologies, in the seat retracted state, the seat back and the seat cushion are stacked on top of each other, and there is further room for improvement from the standpoint of increasing the space inside the vehicle cabin as much as possible.

SUMMARY

The present disclosure provides a vehicle seat structure that may increase space within a vehicle cabin as much as possible when a seat is retracted.

A first aspect of the present disclosure is a vehicle seat structure including: a seat cushion on which a vehicle occupant sits; a seat back that supports a back portion of the vehicle occupant while sitting on the seat cushion in a seat deployed state, the seat deployed state being a state in which the vehicle occupant is able to sit on the seat cushion; and a seat deploying/retracting mechanism that enables the seat cushion and the seat back to slide in a vehicle up-down direction, and that, in a seat retracted state in which the seat cushion and the seat back are retracted, enables the seat cushion and the seat back to be placed in the vehicle up-down direction such that the seat cushion stands upright, and the seat back is placed at an upper side of the seat cushion.

In the vehicle seat structure according to the first aspect of the present disclosure, a seat cushion, a seat back, and a seat deploying/retracting mechanism are provided. A seat deployed state, in which a vehicle occupant is able to sit on the seat cushion, is configured such that a back portion of the seated vehicle occupant who is sitting on the seat cushion is supported by the seat back.

Here, the seat cushion and the seat back are able to slide in the vehicle up-down direction via the seat deploying/retracting mechanism. In the seat retracted state in which the seat cushion and the seat back are retracted, the seat cushion stands upright, and the seat cushion and the seat back can be placed in the vehicle up-down direction such that the seat cushion stands upright, and the seat back is placed on the upper side of the seat cushion.

In the first aspect, in the seat deployed state, the seat cushion is placed so as to extend horizontally, and the seat back is placed in a substantially perpendicular state relative to the seat cushion. However, in the seat retracted state, both the seat cushion and the seat back are placed on a single straight line extending in the vehicle up-down direction.

In other words, in the first aspect of the present disclosure, in the seat retracted state, by standing the seat cushion upright, and placing both the seat back and the seat cushion on a single straight line extending in the vehicle up-down direction, the seat can be retracted with minimum space (i.e. a space corresponding to the plate thickness of the seat back) required for retraction. As a consequence, in the seat retracted state, the space that is normally taken up by the seat cushion when this is deployed into the seat deployed state can be left clear. As a result, in the first aspect of the present disclosure, in the seat retracted state, the space inside the vehicle cabin can be made as large as possible compared to the seat deployed state.

In a second aspect of the present disclosure, in the above-described first aspect, in a case in which the seat back is slid towards a lower side in the vehicle up-down direction in the seat retracted state, the seat deploying/retracting mechanism may place the vehicle seat structure in the seat deployed state by pivoting the seat cushion towards a front side in a seat front-rear direction so as to extend horizontally.

In the vehicle seat structure according to the second aspect of the present disclosure, in the seat retracted state, the seat back is made to slide towards the lower side in the vehicle up-down direction, then the seat cushion is pivoted by the seat deploying/retracting mechanism towards the front side in the seat front-rear direction and extend horizontally, so as to be set in the seat deployed state. In other words, the second aspect of the present disclosure enables the seat cushion to extend horizontally in conjunction with the deploying operation of the seat back.

Here, the term 'extend horizontally' does not mean that the seat cushion is placed so as to extend perfectly horizontally, but instead means 'extends substantially horizontally', namely, extends within a range in which the seat cushion may be offset by a small angle from a perfectly horizontal direction.

In a third aspect of the present disclosure, in the above-described second aspect, the seat deploying/retracting mechanism may include: rails that extend in the vehicle up-down direction; a first supporting portion engaged with the rails, the first supporting portion supporting the seat back such that the seat back is slidable along the rails; and a second supporting portion engaged with the rails, the second supporting portion supporting the seat cushion such that the seat cushion slidable along the rails, and supporting the seat cushion such that the seat cushion pivotable in the seat front-rear direction with a pivoting axial direction extending in the seat width direction.

In the vehicle seat structure according to the third aspect of the present disclosure, the seat deploying/retracting mechanism includes rails, a first supporting portion, and a second supporting portion. The rails are placed so as to extend in the vehicle up-down direction, and the first supporting portion and second supporting portion are engaged with the rails. The first supporting portion supports the seat back via the rails such that the seat back is able to slide along the rails. The second supporting portion supports the seat cushion via the rails such that the seat cushion is able to slide along the rails, and also supports the seat cushion such that the seat cushion is able to pivot in the seat front-rear direction with the axial direction of this pivoting extending in the seat width direction.

As a result, when the seat is being deployed, the seat back slides via the first supporting portion along the rails towards the lower side in the vehicle up-down direction. In addition, the seat cushion slides via the second supporting portion along the rails towards the lower side in the vehicle up-down direction, and this seat cushion is also pivoted towards the front side in the seat front-rear direction, with the axial direction of this pivoting extending in the seat width direction, so as to extend horizontally.

Moreover, in the seat retracted state, when the seat cushion is slide via the second supporting portion along the rails towards the upper side in the vehicle up-down direction, the seat cushion pivots towards the rear side in the seat front-rear direction, with the axial direction of this pivoting extending in the seat width direction, and the seat cushion can be placed to extend in the vehicle up-down direction. At this time, the seat back slides via the first supporting portion towards the upper side in the vehicle up-down direction along the rails.

In a fourth aspect of the present disclosure, in the above-described third aspect, the first supporting portion may support the seat back such that the seat back pivotable in the seat front-rear direction with a pivoting axial direction extending in the seat width direction, and the seat deploying/retracting mechanism may include a hinge portion that enables the seat back and the seat cushion to pivot relatively in the seat front-rear direction with a pivoting axial direction in the seat width direction.

In the vehicle seat structure according to the fourth aspect of the present disclosure, in addition to supporting the seat back such that the seat back is able to slide along the rails, the first supporting portion also supports the seat back such that the seat back is able to pivot in the seat front-rear direction with the axial direction of this pivoting extending in the seat width direction. The seat deploying/retracting mechanism is also formed to further include a hinge portion that enables the seat back and the seat cushion to pivot relatively in the seat front-rear direction with the axial direction of this pivoting extending in the seat width direction.

As a result, when the seat is deployed, the seat back slides via the first supporting portion towards the lower side in the vehicle up-down direction, and the seat cushion slides via the second supporting portion towards the lower side in the vehicle up-down direction, and this seat cushion pivots towards the front side in the seat front-rear direction, with the axial direction of this pivoting extending in the seat width direction, so as to extend horizontally. At this time, the seat back can be pivoted via the hinge portion in the seat front-rear direction relative to the seat cushion with the axial direction of this pivoting extending in the seat width direction. In other words, the seat back can be tilted backwards relative to the seat cushion such that the ride comfort of the vehicle occupants is improved.

In a fifth aspect of the present disclosure, in the above-described fourth aspect, a shaft of the hinge portion may be disposed at a front side in the seat front-rear direction of a shaft of the second supporting portion.

In the vehicle seat structure according to the fifth aspect of the present disclosure, a shaft of the hinge portion that enables the seat back and the seat cushion to pivot relative to each other in the seat front-rear direction is placed at the front side in the seat front rear direction of the shaft of the second supporting portion. The second supporting portion supports the seat cushion such that the seat cushion is able to pivot in the seat front-rear direction.

Due to the above, when the seat back slides towards the lower side in the vehicle up-down direction, moment towards the front side in the seat front-rear direction centering on the shaft of the second supporting portion is applied to the hinge portion side via the shaft of the hinge portion. In other words, when the seat back slide towards the lower side in the vehicle up-down direction, the seat cushion pivots towards the front side in the seat front-rear direction via the hinge portion.

In a sixth aspect of the present disclosure, in the above-described third through fifth aspects, one of the rails may be provided respectively at each end side in the seat width direction of the seat back, and a headrest that becomes exposed in the seat deployed state and supports a head portion of the seated vehicle occupant may be provided between the two rails.

In the vehicle seat structure according to the sixth aspect of the present disclosure, a rail is provided respectively at each end side in the seat width direction of the seat back. A headrest that supports the head portion of the seated vehicle occupant is provided between the two rails, and this headrest is exposed in the seat deployed state.

In the sixth aspect of the present disclosure, when a vehicle seat is transitioned from the seat retracted state to the seat deployed state, since the seat back slides towards the lower side in the vehicle up-down direction, the headrest is exposed once the seat has been deployed. In other words, in the seat retracted state, the headrest is placed in a position between the two rails and superimposed with the seat back.

In this way, in the sixth aspect of the present disclosure, by utilizing the dead space between the two rails to locate the headrest, compared, for example, with when the headrest is provided on top of the seat back, the space inside the vehicle cabin can be increased in the seat retracted state.

In a seventh aspect of the present disclosure, in the above-described aspects, the seat deploying/retracting mechanism may include: an armrest that is linked to the seat back and forms a portion of a linking mechanism and that supports an arm portion of the seated vehicle occupant in the seat deployed state; and a linking member that forms a portion of the linking mechanism, and is linked to the armrest and the seat cushion, the linking member unfolding the armrest in conjunction with an deploying operation of the seat cushion, and folding up the armrest in conjunction with a retracting operation of the seat cushion.

In the vehicle seat structure according to the seventh aspect of the present disclosure, the seat deploying/retracting mechanism includes an armrest and a linking member that each form a part of a linking mechanism. The armrest is linked to the seat back and supports an arm portion of a seated vehicle occupant in the seat deployed state. On the other hand, the linking member is linked to both the armrest and the seat cushion, and causes the armrest to be folded down in conjunction with the deploying operation of the seat cushion, and also causes the armrest to be folded up in conjunction with the retracting operation of the seat cushion.

In this way, this armrest is convenient in that it can be folded down or folded up automatically in conjunction with an operation (i.e., a deploying operation or a retracting operation) of the seat cushion.

In an eighth aspect of the present disclosure, in the above-described seventh aspect, in the seat deployed state, a shape formed by the armrest, the linking member, the seat cushion and the seat back may form a parallelogram that is tilted towards a rear side in the seat front-rear direction when seen from a seat side.

In the vehicle seat structure according to the eighth aspect of the present disclosure, in the seat deployed state, the shape formed by the members of the linking mechanism is a parallelogram that tilts towards a rear side in the seat front-rear direction, when looked at in a seat side view.

In other words, in the eighth aspect of the present disclosure, since the shape formed by the members of linking mechanism is not a rectangle when looked at in a seat side view, and since the linking member and the seat back are not placed at the same dead center, the armrest is able to withstand a heavy load. As a consequence, any wobbling in the armrest is inhibited and a vehicle occupant can lean on the armrest with confidence.

A ninth aspect of the present disclosure, in the above-described aspects, may further include a seat cushion supporting member provided at a free-end side of the seat cushion, the seat cushion supporting member being pivotable in the seat front-rear direction with a pivoting axial direction extending in the seat width direction, and supporting the seat cushion in the seat deployed state in conjunction with the deploying operation and the retracting operation of the seat cushion.

In the vehicle seat structure according to the ninth aspect of the present disclosure, a seat cushion supporting member that can pivot in the seat front-rear direction in conjunction with the deploying operation and the retracting operation of the seat cushion, with the axial direction of this pivoting extending in the seat width direction, is provided at a free-end side of the seat cushion. This seat cushion supporting member is provided to support the seat cushion in the seat deployed state. As a consequence, the seat cushion is able to withstand heavy loads.

In a tenth aspect of the present disclosure, in the above-described third aspect and ninth aspect, a shaft of the seat cushion supporting member may be disposed at the front side in the seat front-rear direction of the shaft of the second supporting portion.

In the vehicle seat structure according to the tenth aspect of the present disclosure, a shaft of the seat cushion supporting member that supports the seat cushion is placed at the front side in the seat front-rear direction of the shaft of the second supporting portion that pivotably supports the seat cushion.

Due to the above, when the seat back slides towards the lower side in the vehicle up-down direction, moment towards the front side in the seat front-rear direction centering at the shaft of the second supporting portion is applied to the seat cushion supporting member side via the shaft of the seat cushion supporting member. In other words, when the seat back slides towards the lower side in the vehicle up-down direction, the seat cushion pivots towards the front side in the seat front-rear direction via the seat cushion supporting member.

According to the above aspects, a vehicle seat structure of the present disclosure may increase space within a vehicle cabin as much as possible when a seat is retracted.

BRIEF DESCRIPTION OF THE DRAWINGS

Exemplary embodiments of the present disclosure will be described in detail based on the following figures, wherein.

DETAILED DESCRIPTION

Hereinafter, a vehicle seat structure according to an exemplary embodiment of the present disclosure will be described in detail based on the drawings. Note that an arrow FR, an arrow UP, and an arrow RH that are illustrated in the appropriate drawings respectively indicate a forward direction, an upward direction, and a right-side direction of a vehicle in which the vehicle seat structure according to an exemplary embodiment of the present disclosure has been applied. Hereinafter, if front-rear, up-down, or left-right directions are used in the following description, then, unless specifically stated otherwise, these refer respectively to the front-rear directions of the vehicle seat, the up-down directions of the vehicle seat, and the left-right directions of the vehicle seat when the vehicle seat is facing forwards.

Figure 1:
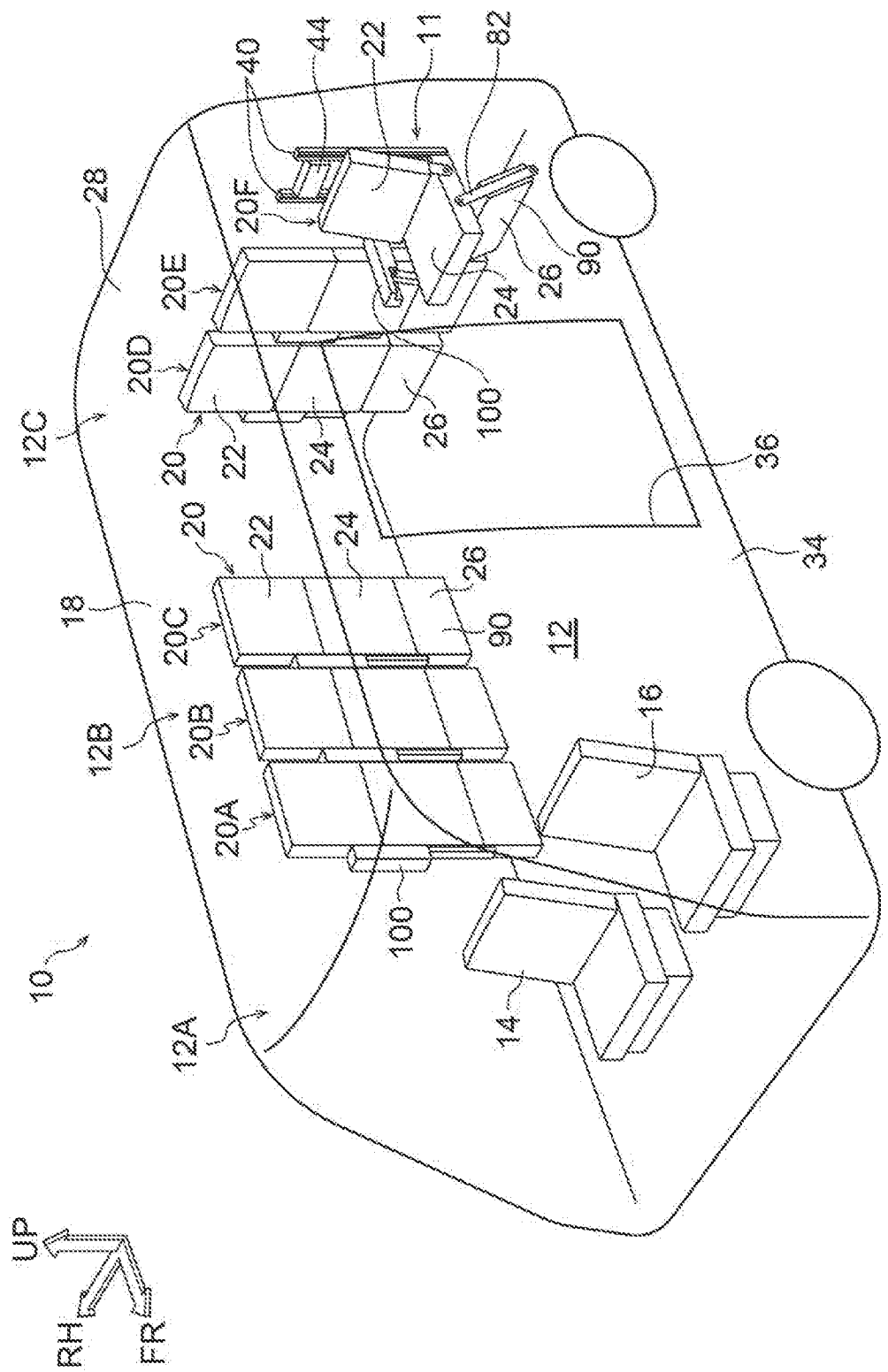
FIG. 1 is a perspective view, looking diagonally from a front-left direction of a vehicle, illustrating a vehicle cabin interior of a vehicle in which the vehicle seat structure according to an exemplary embodiment has been applied.

Firstly, the configuration of the vehicle seat structure according to the present exemplary embodiment will be described. In FIG. 1, a perspective view, looking diagonally from a front-left direction of a vehicle 10, in which the vehicle seat structure according to the present exemplary embodiment has been applied is illustrated, while in FIG. 2, a plan view of the vehicle 10 is illustrated.

Figure 2:
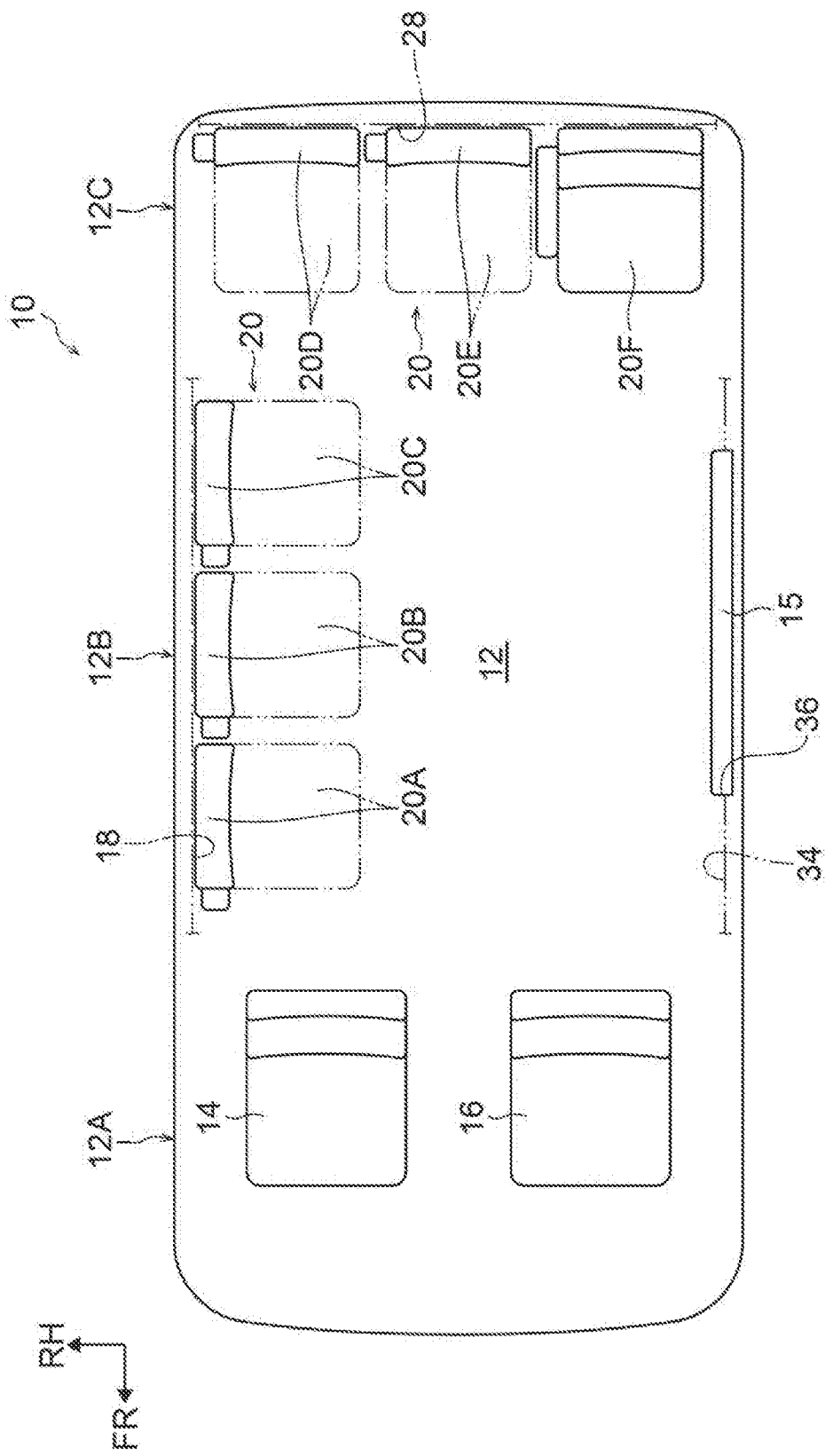
FIG. 2 is a plan view illustrating a vehicle cabin interior of a vehicle in which the vehicle seat structure according to an exemplary embodiment has been applied.

As illustrated in FIG. 1 and FIG. 2, for example, front seats 14 and 16 are placed in a vehicle width direction on a front portion 12A side in the vehicle front-rear direction inside a vehicle cabin interior 12 of the vehicle 10. In some embodiments, the front seats 14 and 16 may not be provided in the case of a vehicle that is able to perform self-driving.

Three vehicle seats (hereinafter, referred to simply as 'seats') 20 (i.e., 20A, 20B, 20C) are provided adjacently to each other in the vehicle front-rear direction along a right-side wall portion 18 of the vehicle 10 in a central portion 12B in the vehicle front-rear direction on the vehicle cabin interior 12 side of the vehicle 10. Note that each one of these seats 20A, 20B, and 20C is arranged so as to extend in a straight line in the vehicle up-down direction (i.e., in what is hereinafter described as a 'seat retracted state').

In the present exemplary embodiment, a seat back 22, a seat cushion 24, and a seat cushion supporting member 26, which each form a portion of the seat 20, are each formed in a rectangular plate shape. In addition, when the seats 20 are in the retracted state, the seat cushion 24 stands upright so that the seat back 22, the seat cushion 24, and the seat cushion supporting member 26 are arranged in that sequence from the top in the vehicle up-down direction in a straight line in the vehicle up-down direction.

In addition, three seats 20 (i.e., 20D, 20E, 20F) are provided adjacently to each other in the vehicle width direction along a rear wall portion 28 of the vehicle 10 in a rear portion 12C in the vehicle front-rear direction on the vehicle cabin interior 12 side of the vehicle 10. The seats 20D and 20E are each placed in the seat retracted state, however, the seat 20F has been deployed into a state in which a vehicle occupant is able to sit therein (i.e., is in what is hereinafter described as a 'seat deployed state').

Moreover, an opening portion 36 is formed in the central portion 12B in the vehicle front-rear direction in a left-side wall portion 34 of the vehicle 10, and a closable door 15 (see FIG. 2) is provided inside this opening portion 36. Note that the position of the closable door 15 is not limited to the left-side wall portion 34. The placement of the seats 20 may also be altered in accordance with the position of the closable door 15.

Here, the structure of the seats 20 will be described. Note that the seats 20A, 20B, 20C, 20D, 20E, and 20F each have substantially the same structure.

Figure 3:
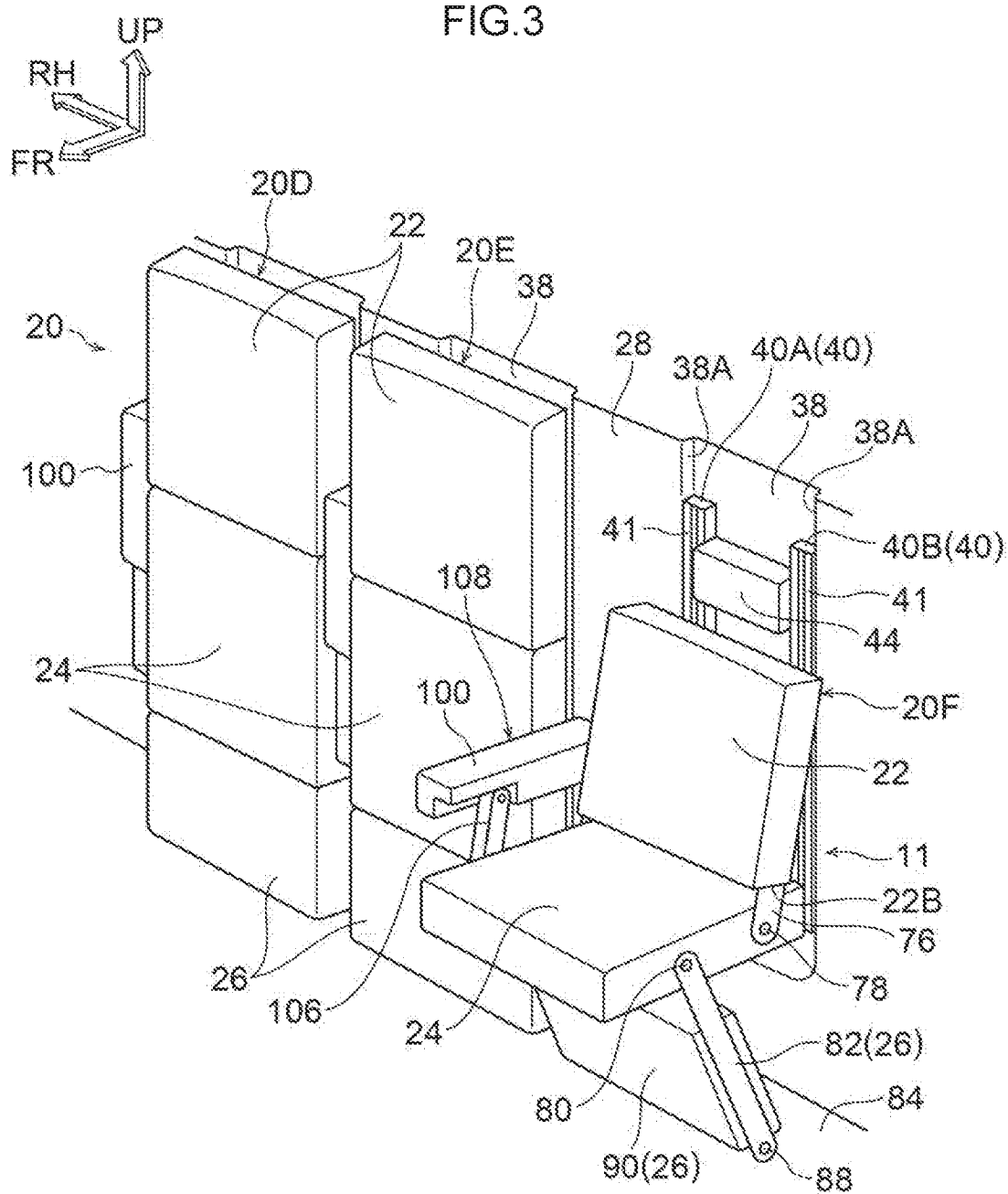
FIG. 3 is a perspective view looking diagonally from a front-left direction of a vehicle illustrating vehicle seats in which the vehicle seat structure according to an exemplary embodiment has been applied.

In FIG. 3, a perspective view of the seats 20, looking diagonally from a front-left direction, is illustrated. As illustrated in FIG. 3, recessed portions 38 that are recessed in the vehicle front-rear direction are formed in the rear wall portion 28 of the vehicle 10 where the seats 20 are provided. A pair of rails 40 (40A and 40B) that form a portion of a seat deploying/retracting mechanism 11 are installed in the recessed portions 38 along side walls 38A of the recessed portions 38. In some embodiments, the recessed portions 38 may not be provided.

A headrest 44 is provided on an upper portion 41 side of the rails 40 between a rail 40A which is mounted on the right side in the seat width direction and a rail 40B which is mounted on the left side in the seat width direction. The headrest 44 is formed in a substantially rectangular parallelepiped shape, and when the seat 20 is in the retracted state, the headrest 44 is placed so as to overlap in the seat front-rear direction with the seat back 22. In addition, the plate thickness of the headrest 44 is set to a plate thickness that allows it to not interfere with the seat back 22 when the seat back 22 is sliding along the rails 40. Note that, except for when there is a need to differentiate between them, the rails 40A and 40B are hereinafter described simply as 'rails 40'.

Figure 4:
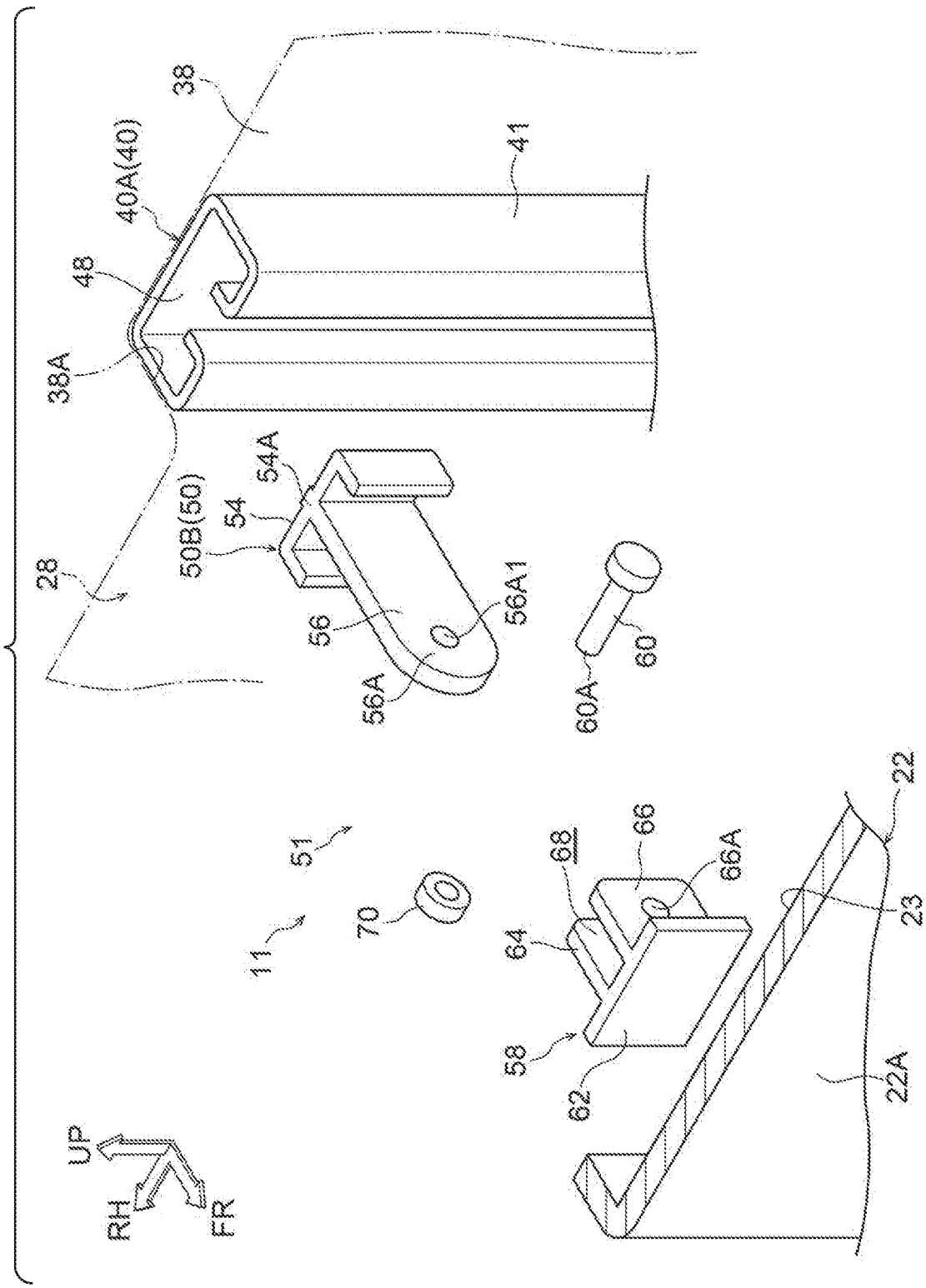
FIG. 4 is an exploded perspective view illustrating a portion of a structure of a seat back of a vehicle seat in which the vehicle seat structure according to an exemplary embodiment has been applied.

As illustrated in FIG. 3 and FIG. 4, lip channel steel is used for each of the rails 40A and 40B, and a channel portion 48 is formed in each of the rails 40A and 40B. Note that an exploded perspective view illustrating a portion of the structure of the seat back 22 is illustrated in FIG. 4, and only the rail 40A side is illustrated.

Figure 5:
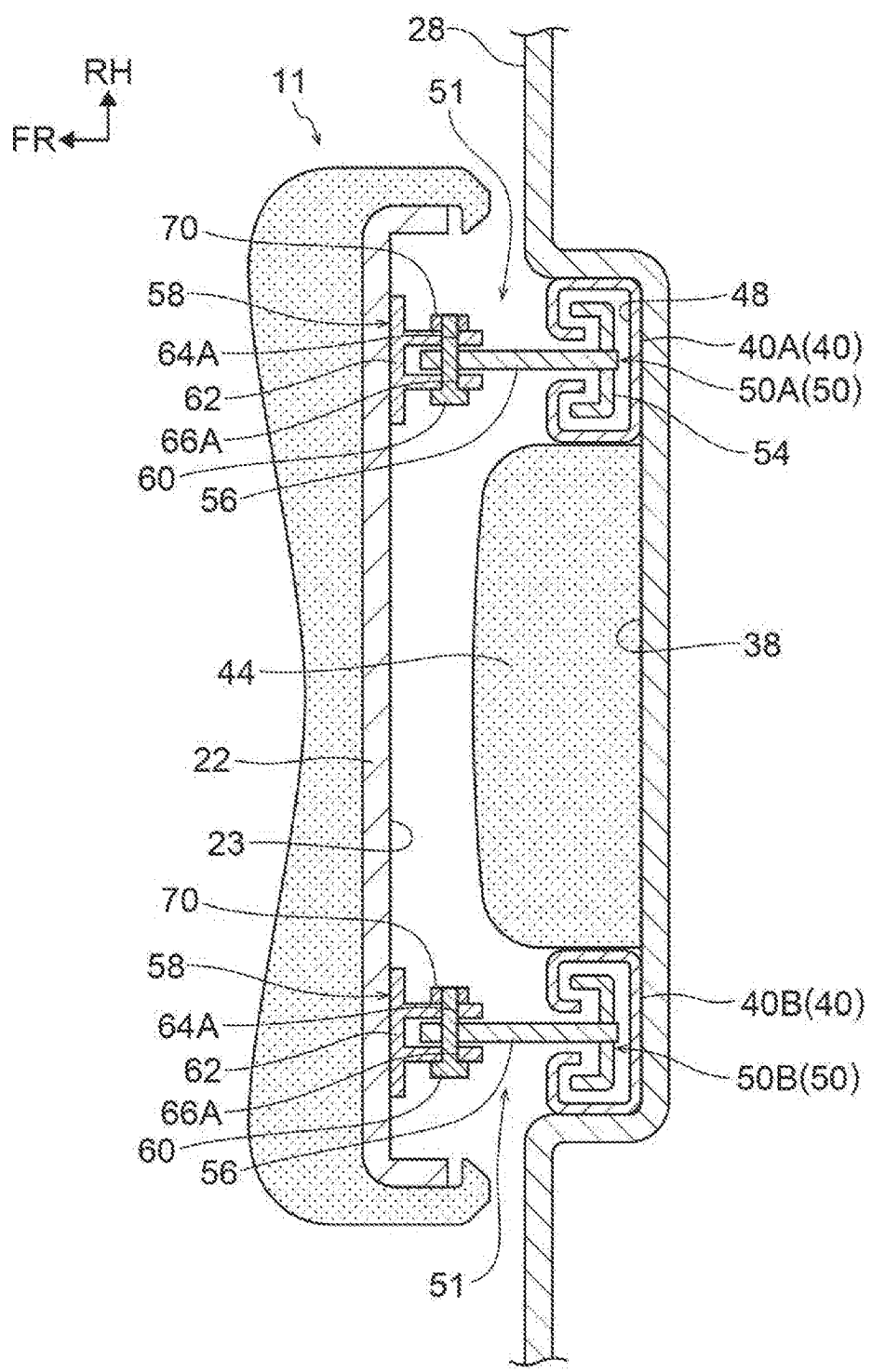
FIG. 5 is a cross-sectional view taken across a line A-A illustrated in FIG. 6.
Figure 6:
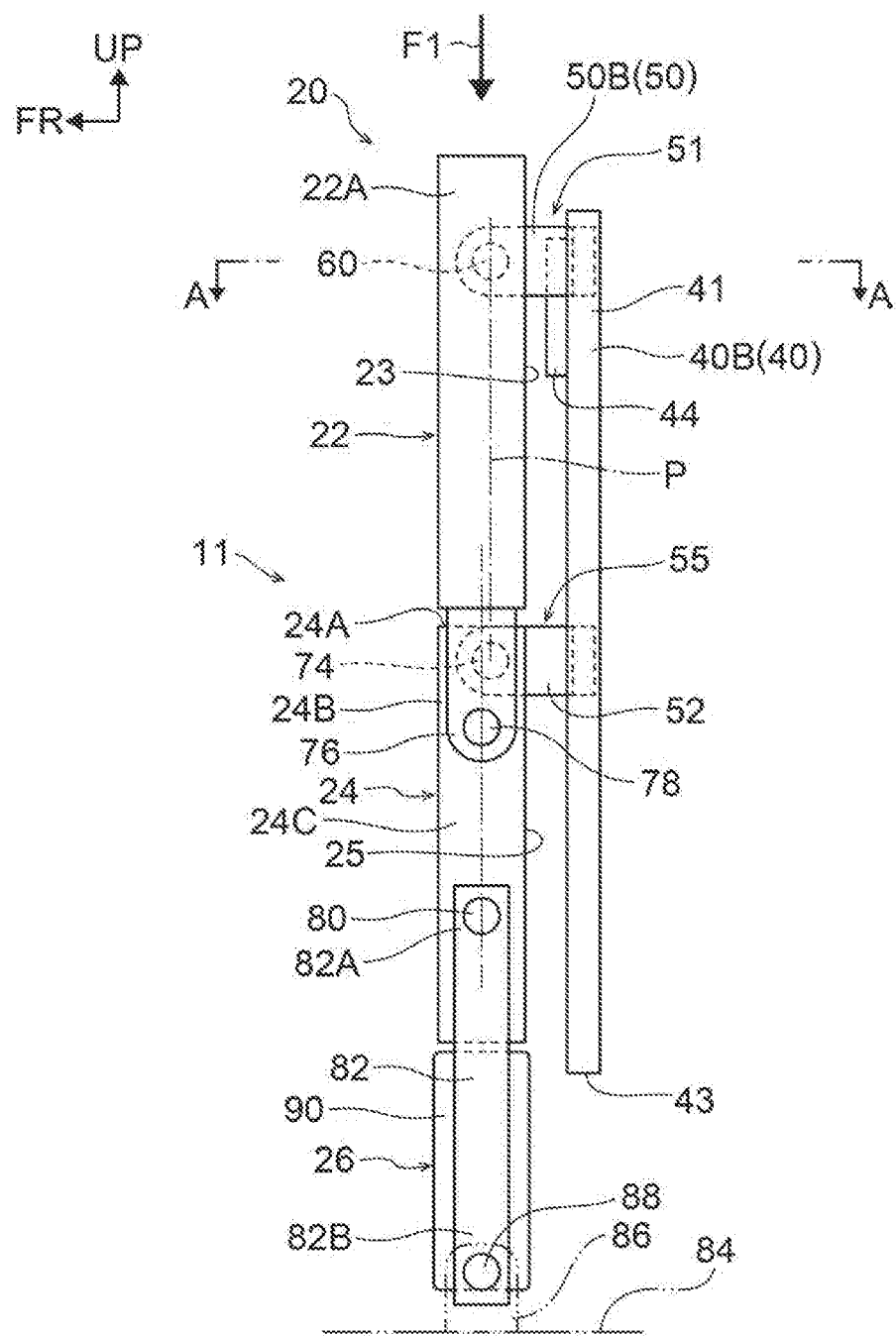
FIG. 6 is a side view illustrating a retracted state of a vehicle seat in which the vehicle seat structure according to an exemplary embodiment has been applied.

Moreover, as illustrated in FIG. 5, a pair of brackets 50 (50A and 50B) that each form a portion of a supporting member (i.e., a first supporting portion, a seat deploying/retracting mechanism) 51 are provided respectively extending in the seat width direction in the rails 40A and 40B. Note that a cross-sectional view taken across a line A-A in FIG. 6 is illustrated in FIG. 5, and a side view illustrating the retracted state of the seat 20 is illustrated in FIG. 6.

A pair of brackets 52 that form a portion of a pair of supporting members (i.e., second supporting portions, seat deploying/retracting mechanism) are provided respectively at a lower side of the pair of brackets 50A and 50B. Note that, since only the bracket 52 mounted on the left side in the seat width direction is illustrated, unlike the case with the brackets 50A and 50B, no distinction is made between the right side and the left side in the seat width direction. In addition, in the same way as the rails 40A and 40B, except for when there is a need to differentiate between them, the brackets 50A and 50B are hereinafter described simply as 'brackets 50'.

As illustrated in FIG. 4 and FIG. 5, the brackets 50 are formed substantially in a T-shape when looked at in plan view, and are formed so as to include an engaging portion 54, and a linking plate 56 that protrudes from a central portion 54A of the engaging portion 54. The engaging portion 54 is engaged by being housed inside the channel portion 48 of the rail 40, and is able to slide in the longitudinal direction of the rail 40 (i.e., in the vehicle up-down direction. In addition, a bracket 58 which forms another part of the supporting member 51 is able to be engaged with the linking plate 56, and a hole portion 56A1 is formed in the center of a distal end portion 56A of the linking plate 56. A shaft 60 is able to be inserted through this hole portion 56A1.

The bracket 58 is formed including a fixing plate 62 and shaft-receiving plates 64 and 66. The fixing plate 62 is formed in a rectangular plate shape, and the bracket 58 is fixed to a back surface 23 of the upper portion 22A side of the seat back 22 via this fixing plate 62. Additionally, a gap 68 is provided between the shaft-receiving plate 64 and the shaft-receiving plate 66, and the linking plate 56 of the bracket 50 is able to be inserted inside this gap 68. Hole portions 64A and 66A are formed respectively in central portions of the shaft-receiving plates 64 and 66, and the shaft 60 whose axis extends in the seat width direction is able to be inserted inside these hole portions 64A and 66A.

Due to the above, once the linking plate 56 of the bracket 50 has been inserted between the shaft-receiving plate 64 and the shaft-receiving plate 66 of the bracket 58, the shaft 60 is inserted through the hole portion 66A in the shaft-receiving plate 66, the hole portion 56A1 in the linking plate 56, and the hole portion 64A in the shaft-receiving plate 64, and a retaining ring 70 is then fixed onto an outer circumference of the distal end portion 60A of the shaft 60.

As a result, the bracket 50 and the bracket 58 are linked together, and the seat back 22 is supported on the rails 40 via the brackets 50 and 58. In addition, the seat back 22 is able to slide along the rails 40 via the brackets 50 and 58. Moreover, the bracket 58 is able to pivot relative to the bracket 50 around the shaft 60 (with the axial direction of this pivoting extending in the seat width direction). In other words, the seat back 22 is able to pivot in the seat front-rear direction around the shaft 60 via the supporting member 51 that is formed so as to include the brackets 50 and 58.

Note that, since the bracket 52 has substantially the same structure as the bracket 50, only description thereof is given. As illustrated in FIG. 6, the bracket 52 is able to slide in the longitudinal direction of the rails 40, and a bracket (not illustrated in the drawings) is linked to the bracket 52. This bracket (not illustrated in the drawings) is fixed to a back surface 25 of an upper end 24A side of the seat cushion 24.

In other words, the seat cushion 24 is supported on the rails 40 via a supporting portion 55 that includes the bracket (not illustrated in the drawings) and the bracket 52, and the seat cushion 24 is able to slide along the rails 40. Note that, a lower end 43 of the rails 40 is closed off, and when the bracket 52 reaches the lower end 43 of the rails 40, any further movement thereof is blocked.

The seat cushion 24 is able to pivot in the seat front-rear direction (with the axial direction of this pivoting extending in the seat width direction) around a shaft 74 provided in the bracket 52. Note that, although not illustrated in the drawings, for example, a stopper is provided on the bracket 52, and when the seat cushion 24 is placed in a substantially horizontal state (i.e., the seat deployed state), a protruding portion provided on the seat cushion 24 abuts against the stopper so that any further pivoting movement of the seat cushion 24 is blocked. Naturally, it is also possible for the deployed state of the seat cushion 24 to be maintained by interference with other members.

Figure 8:
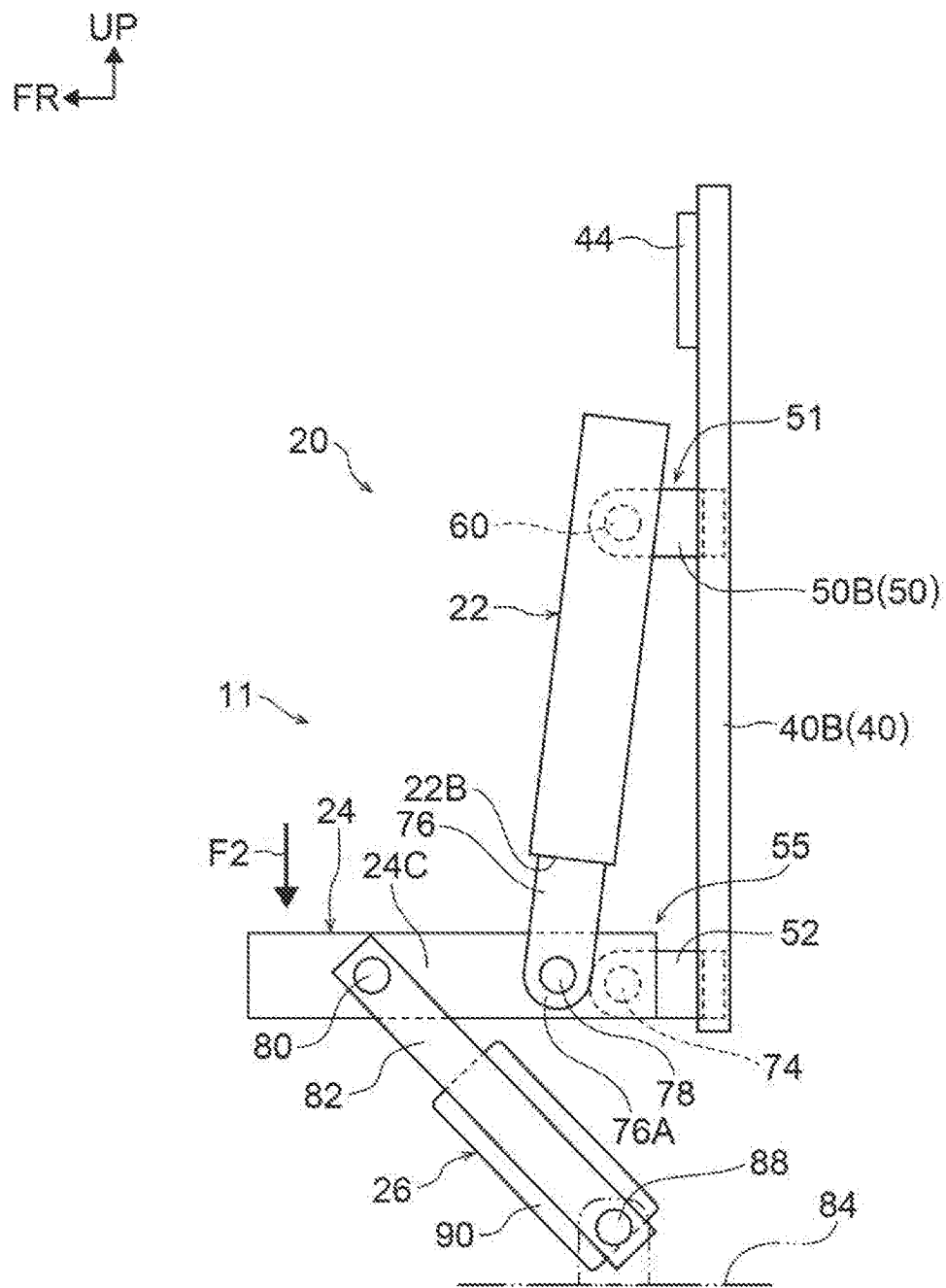
FIG. 8 is a side view illustrating a deployed state of a vehicle seat in which the vehicle seat structure according to an exemplary embodiment has been applied.

Note that, as illustrated in FIG. 3 and FIG. 8, hinge portions (i.e., the seat deploying/retracting mechanism) 76 extend downwards from lower ends 22B at both ends in the seat width direction of the seat back 22. A shaft portion (i.e., a shaft of the hinge portion) 78 whose axial direction extends in the seat width direction is inserted through a distal end portion 76A of each hinge portion 76, and the hinge portions 76 are able to pivot in the seat front-rear direction around these shaft portions 78. Note that a side view illustrating the deployed state of the seat 20 is illustrated in FIG. 8.

As illustrated in FIG. 6, in the retracted state of the seat 20, the shaft portion 78 of each hinge portion 76 is fixed to the side of the seat cushion 24 that becomes the upper portion 24B side thereof, and the seat back 22 is able to pivot in the seat front-rear direction relative to the seat cushion 24 (i.e., is able to perform a relative pivoting motion) via the shaft portion 78. Note that, in the seat retracted state, the shaft portion 78 of the hinge portion 76 is positioned at the lower side of the shaft 74 of the bracket 52 and at the front side thereof in the seat front-rear direction.

Moreover, as illustrated in FIG. 8, a shaft portion 80 whose axial direction extends in the seat width direction is provided at both ends in the seat width direction of the seat cushion 24 and at a free-end side thereof (i.e., on the seat front side of a central portion 24C in the seat front-rear direction of the seat cushion 24 when in the seat deployed state). One end portion 82A in a longitudinal direction of a pair of linking members 82 that are formed in an elongated plate shape and form part of the seat cushion supporting member 26 is pivotably attached to each shaft portion 80.

In other words, the linking members 82 are able to rotate in the seat front-rear direction around the shaft portions 80. Note that, as illustrated in FIG. 6, in the retracted state of the seat 20, the shaft portions 80 of the linking members 82 are positioned at the lower side of the shaft 74 of the brackets 52 and at the front side thereof in the seat front-rear direction.

Furthermore, as illustrated in FIG. 6, shaft-receiving portions 86 are fixed to a floor panel 84 of the vehicle 10 at the lower side of the seat cushion 24 when the seat 20 is in the retracted state. A shaft portion 88 is fixed to each shaft-receiving portion 86, and another end portion 82B in the longitudinal direction of the pair of linking members 82 is pivotably attached to the respective shaft portion 88. A support portion 90 that is formed in a plate shape, and forms another portion of the seat cushion supporting member 26 is provided between the pair of linking members 82. Deformation of the linking members 82 can be inhibited by this support portion 90.

Next, an action of the vehicle seat structure according to the present exemplary embodiment will be described.

Figure 7:
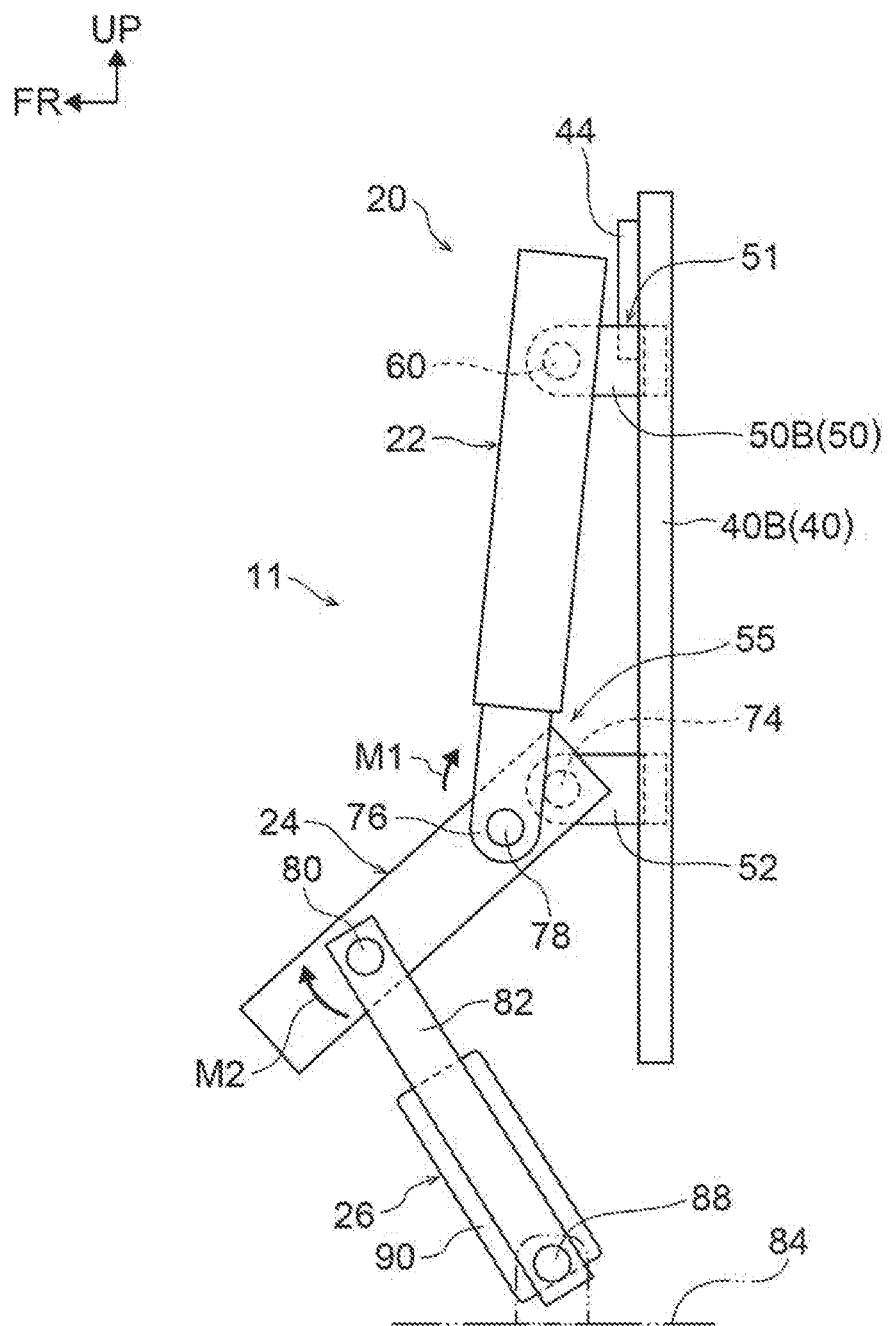
FIG. 7 is a side view illustrating a state between a retracted state and a deployed state of a vehicle seat in which the vehicle seat structure according to an exemplary embodiment has been applied.

As illustrated in FIG. 6, in the retracted state of the vehicle seat 20, when the seat back 22 is pressed downwards (i.e., if a load F1 is input), then as illustrated in FIG. 7, the seat back 22 slides towards the lower side along the rails 40 via the brackets 50. Note that, a side view illustrating a state between the retracted state and the deployed state of the seat 20 is illustrated in FIG. 7. Additionally, as a result of the seat back 22 sliding towards the lower side, the seat cushion 24 also slides towards the lower side along the rails 40 via the brackets 52.

As a result, the seat cushion 24 pivots towards the front side in the seat front-rear direction via the shafts 74 provided in the brackets 52, and the linking members 82 pivots towards the front side in the seat front-rear direction around the shaft portions 88 via the shaft portions 80 provided in the seat cushion 24. In addition, the seat back 22 pivots towards the rear side in the seat front-rear direction around the shaft portions 78 of the hinge portions 76 via the shaft portions 78 provided in the hinge portions 76 that cause the seat cushion 24 and the seat back 22 to pivot relative to each other, and via the shafts 60 provided in the brackets 50.

As a result, as illustrated in FIG. 8, the seat 20 is placed in the deployed state (i.e., in the seat deployed state).

On the other hand, as illustrated in FIG. 8, in the deployed state of the seat 20, if the free-end side of the seat cushion 24 is pressed downwards (i.e. if a load F2 is input), then as illustrated in FIG. 7, the seat cushion 24 pivots towards the rear side in the seat front-rear direction around the shafts 74 of the brackets 52. In addition, the seat cushion 24 slides towards the upper side along the rails 40 via the brackets 52.

As a result, the seat back 22 also slides towards the upper side along the rails 40 via the brackets 50, so that the angle formed between the seat back 22 and the seat cushion 24 via the shaft portions 78 of the hinge portions 76 increases.

In addition, at the free-end side of the seat cushion 24, the linking members 82 are pivoted towards the rear side in the seat front-rear direction around the shaft portions 88 via the shaft portions 80. Furthermore, the seat back 22 pivots towards the front side in the seat front-rear direction around the shaft portions 78 of the hinge portions 76 via the shaft portions 78 provided in the hinge portions 76, and via the shafts 60 provided in the brackets 50.

As a result of this operation, as illustrated in FIG. 6, the seat cushion 24 stands upright so that the seat back 22, the seat cushion 24, and the support portion 90 are arranged substantially in a straight line in the vehicle up-down direction (i.e., are placed in the seat retracted state).

As has been described above, in the present exemplary embodiment, the seat cushion 24 and the seat back 22 can be made to slide in the vehicle up-down direction by the seat deploying/retracting mechanism 11. In addition, in the retracted position of the seat 20 in which the seat cushion 24 and the seat back 22 are retracted, the seat cushion 24 and the seat back 22 can be arranged in the vehicle up-down direction such that the seat back 22 is placed above seat cushion 24.

In the present exemplary embodiment, as illustrated in FIG. 8, in the deployed state of the seat 20, the seat cushion 24 is placed in a substantially horizontal state, and the seat back 22 is placed in a substantially perpendicular state relative to the seat cushion 24. On the other hand, as illustrated in FIG. 6, in the retracted state of the seat 20, the seat cushion 24 is placed upright, and the seat back 22 and the seat cushion 24 are arranged in a straight line extending in the vehicle up-down direction.

In this way, in the present exemplary embodiment, in the retracted state of the seat 20, by arranging the seat back 22 and the seat cushion 24 in a straight line extending in the vehicle up-down direction, the seat 20 is retracted in the minimum space (i.e. a space corresponding to the plate thickness of the seat back 22) required for retracted.

As a consequence, as illustrated in FIG. 6 and FIG. 8, in the retracted state of the seat 20 in the present exemplary embodiment, the space that is normally taken up by the seat cushion 24 when in the deployed state of the seat 20 can be left clear. As a result, in the present exemplary embodiment, in the retracted state of the seat 20, the space inside the vehicle cabin interior 12 may be made as large as possible compared to when the seat 20 is placed in the deployed state.

Note that by set the plate thicknesses of the seat back 22 and the seat cushion 24 such that they are substantially the same as each other, in the retracted state of the seat 20, the seat back 22 and the seat cushion 24 are arranged to be continuous with each other in the vehicle up-down direction. In other words, compared to a case in which protruding portions and recessed portions are provided in the seat back 22 and the seat cushion 24 extending in the plate thickness direction thereof, in the present exemplary embodiment, the feeling of space inside the vehicle cabin interior 12 may be increased by the amount that the seat 20 is made narrower.

Moreover, in the present exemplary embodiment, as illustrated in FIG. 6 through FIG. 8, in the seat retracted state, when the seat back 22 slides towards the lower side in the vehicle up-down direction, the seat cushion 24 extends horizontally and is placed in the seat deployed state by the seat deploying/retracting mechanism 11.

In other words, in the present exemplary embodiment, the seat cushion 24 may be placed in a horizontal state in conjunction with the deploying operation of the seat back 22. In addition, the transition from the retracted state of the seat 20 to the deployed state of the seat 20 may be achieved easily, by simply sliding the seat back 22 towards the lower side in the vehicle up-down direction.

Here, in the present exemplary embodiment, the seat deploying/retracting mechanism 11 includes the rails 40, the supporting members 51, and the supporting members 55. The rails 40 are mounted so as to extend in the vehicle up-down direction, and the supporting members 51 and the supporting members 55 are engaged with the rails 40.

The supporting members 51 support the seat back 22 via the rails 40 such that the seat back 22 is slidable along the rails 40. The supporting members 55 support the seat cushion 24 via the rails 40 such that the seat cushion 24 is slidable along the rails 40, and also support the seat cushion 24 such that the seat cushion 24 is pivotable relative to the shafts 74 provided in these supporting members 55.

As a consequence, in the present exemplary embodiment, when the seat 20 is being deployed, the seat back 22 slides (i.e., moves) towards the lower side in the vehicle up-down direction along the rails 40. As a result of this movement of the seat back 22, the seat cushion 24 slides via the supporting members 55 towards the lower side in the vehicle up-down direction along the rails 40, and the seat cushion 24 is also pivots towards the front side in the seat front-rear direction around the shafts 74 so as to extend horizontally.

Moreover, in the present exemplary embodiment, when retracting the seat 20, when the seat cushion 24 is made to slide via the supporting members 55 towards the upper side in the vehicle up-down direction along the rails 40, then, the seat cushion 24 pivots towards the rear side in the seat front-rear direction around the shafts 74, and the seat cushion 24 can be placed so as to extend in the vehicle up-down direction. At this time, the seat back 22 slid via the supporting members 51 towards the upper side in the vehicle up-down direction along the rails 40.

In other words, in the present exemplary embodiment, the seat back 22 and the seat cushion 24 are made to slide along the rails 40, so as to transition between the retracted state of the seat 20 and the deployed state of the seat 20.

Furthermore, in the present exemplary embodiment, in addition to supporting the seat back 22 such that the seat back 22 can slide along the rails 40, the supporting members 51 also support the seat back 22 such that the seat back 22 can pivot around the shafts 60. In addition, the seat deploying/retracting mechanism 11 further include the hinge portions 76 that enable the seat back 22 and the seat cushion 24 to pivot relative to each other, and the hinge portion 76 is able to pivot in the seat front-rear direction around the shaft portions 78 that extend in the seat width direction.

As a result, in the present exemplary embodiment, when the seat 20 is in the deployed state, the seat back 22 slides via the supporting members 51 towards the lower side in the vehicle up-down direction, and the seat cushion 24 slides via the supporting members 55 towards the lower side in the vehicle up-down direction, and extends horizontally. At this time, the seat back 22 pivots via the hinge portions 76 around the shaft portions 78 relative to this seat cushion 24. In other words, the seat back 22 can be tilted backwards relative to the seat cushion 24 so that the ride comfort of the vehicle occupants may be improved.

Moreover, in the present exemplary embodiment, as illustrated in FIG. 3, the headrest 44 that supports the head portion of a seated vehicle occupant is provided between the rail 40A and the rail 40B, and this headrest 44 is set up so as to be exposed in the deployed state of the seat 20.

In other words, in the present exemplary embodiment, as illustrated in FIG. 6 through FIG. 8, when transitioning from the retracted state of the seat 20 to the deployed state of the seat 20, since the seat back 22 can slide towards the lower side in the vehicle up-down direction, the headrest 44 is only exposed once the seat 20 has been deployed. In other words, as illustrated in FIG. 6, in the retracted state of the seat 20, the headrest 44 is placed between the rail 40A and the rail 40B (see FIG. 3), and is placed in a position that overlaps with the seat back 22.

In this way, in the present exemplary embodiment, by utilizing the dead space between the rail 40A and the rail 40B (see FIG. 3) to locate the headrest 44, compared, for example, with a case in which the headrest 44 is provided on top of the seat back, in the retracted state of the seat 20, the space inside the vehicle cabin interior 12 may be increased.

Furthermore, in the present exemplary embodiment, the linking member 82 that operates in conjunction with the deploying operation and the retracting operation of the seat cushion 24 is provided at the free-end side of the seat cushion 24. This linking member 82 is provided so as to pivot in the seat front-rear direction around the shaft portion 88. As illustrated in FIG. 8, this linking member 82 supports the seat cushion 24 in the deployed state of the seat 20. As a consequence, the seat cushion 24 may withstand heavy loads.

Here, as illustrated in FIG. 6, in the present exemplary embodiment, the shaft portion 78 of the hinge portion 76 that supports the seat cushion is placed so that, in the seat retracted state, this shaft portion 78 is at the front side in the seat front-rear direction of the shaft 74 of the supporting portion 55 that supports the seat cushion 24 such that the seat cushion 24 is able to pivot in the seat front-rear direction.

For example, as a comparative example, although not illustrated in the drawings, the shaft portion 78 of the hinge portion 76 illustrated in FIG. 6 is provided on a straight line P that connects the shaft 60 of the supporting member 51 to the shaft 74 of the supporting member 55. Since the straight line P is what is known as a dead center line, in this case, the seat cushion 24 is able to pivot to the front side in the seat front-rear direction or to the rear side in the seat front-rear direction.

Due to the above, in the present exemplary embodiment, as is described above, the shaft portion 78 of the hinge portion 76 is placed such that, in the retracted state of the seat 20, this shaft portion 78 is at the front side in the seat front-rear direction of the shaft 74 of the supporting portion 55. As a result, when the seat back 22 is made to slide toward the lower side in the vehicle up-down direction, moment M1 (see FIG. 7) towards the front side in the seat front-rear direction centering on the shaft 74 of the supporting member 55 is applied to the hinge portion 76 side via the shaft portion 78 of the hinge portion 76.

Accordingly, in the present exemplary embodiment, when the seat back 22 is made to slide towards the lower side in the vehicle up-down direction, the seat cushion 24 can be made to pivot towards the front side in the seat front-rear direction via the hinge portion 76.

Furthermore, in the present exemplary embodiment, in the same way as the shaft portion 78 of the hinge portion 76, the shaft portion 80 of the linking member 82 is also placed such that, in the retracted state of the seat 20, this shaft portion 78 is at the front side in the seat front-rear direction of the shaft 74 of the supporting portion 55. As a result, when the seat back 22 slide towards the lower side in the vehicle up-down direction, moment M2 (>M1: see FIG. 7) towards the front side in the seat front-rear direction centering on the shaft 74 of the supporting member 55 is applied to the linking member 82 side via the shaft portion 80 of the linking member 82.

Accordingly, in the present exemplary embodiment, as illustrated in FIG. 6 through FIG. 8, when the seat back 22 slide towards the lower side in the vehicle up-down direction, the seat cushion 24 pivots towards the front side in the seat front-rear direction via the linking member 82. Because the shaft portion 80 of the linking member 82 is located further from the shaft 74 of the supporting member 55 than is the shaft portion 78 of the hinge portion 76, the seat cushion 24 may be pivoted even more effectively towards the front side in the seat front-rear direction beyond the hinge portion 76.

Note that in the present exemplary embodiment, as illustrated in FIG. 6, in the retracted state of the seat 20, the shaft portion 80 of the linking member 82 and the shaft portion 78 of the hinge portion 76 are placed at the front side in the seat front-rear direction of the shaft 74 of the supporting member 55. In addition, when the seat back 22 is being made to slide towards the lower side in the vehicle up-down direction, the seat cushion 24 is pivoted towards the front side in the seat front-rear direction.

In other words, in the present exemplary embodiment, the seat cushion 24 is pivoted in conjunction with the sliding operation of the seat back 22, however, the present disclosure is not limited to this. For example, it is also possible for the seat cushion 24 to be operated by being pulled towards the front side in the seat front-rear direction, and for the seat back 22 to be made to slide towards the lower side in the vehicle up-down direction. In this case, there is no need for the positional relationships between the shaft portions 80 of the linking members 82, the shaft portions 78 of the hinge portions 76, and the shafts 74 of the supporting members 55 to be restricted to those described above.

Moreover, in the present exemplary embodiment, in the retracted state of the seat 20, a structure is employed in which the seat back 22 is pushed from the upper side towards the lower side so that the seat back 22 is made to slide towards the lower side, however, the present disclosure is not limited to this. For example, it is also possible for a vehicle occupant to lean their back against the seat back 22, and for the seat back 22 to be made to slide towards the lower side using the friction force thereby generated. In this case, if the vehicle occupant bends their knees at the same time as they are leaning their back against the seat back 22, then this action enables the occupant to sit on the seat cushion 24.

Furthermore, in the present exemplary embodiment, in the deployed state of the seat 20 illustrated in FIG. 8, by pressing the free-end side of the seat cushion 24 towards the lower side, the seat cushion 24 is arranged so as to extend in the vehicle up-down direction, however, the present disclosure is not limited to this. For example, it is instead possible to employ a structure in which, in the deployed state of the seat 20, by causing the seat back 22 to slide towards the upper side, the seat cushion 24 is arranged so as to extend in the vehicle up-don direction via this seat back 22.

Moreover, although not illustrated in the drawings, it is also possible for a torsion spring that urges the seat 20 in a storage direction to be installed between the seat cushion 24 and the supporting member 55. By employing this structure, when transitioning from the retracted state of the seat 20 to the deployed state of the seat 20, this torsion spring generates resistance when the seat back 22 is being made to slide towards the lower side in the vehicle up-down direction, however, the torsion spring also enables the retracted state of the seat 20 to be maintained against vibrations and the like generated when the vehicle is traveling. In addition, a separate locking mechanism may also be provided in order to maintain the retracted state of the vehicle 10.

Furthermore, in the present exemplary embodiment, as illustrated in FIG. 3, the rails 40 are formed by two rails that are provided respectively on each side in the seat width direction, however, in some embodiments, two rails may not be provided, and instead only one rail 40 may be provided. In this case, the rail 40 is provided in a central portion in the seat width direction.

Moreover, in the present exemplary embodiment, the binge portions 76 that enable the seat cushion 24 and the seat back 22 to pivot relatively to each other are provided, and seat back 22 is thereby able to pivot towards the rear side in the seat front-rear direction around the shaft portions 78 of the hinge portions 76. As a consequence of this, in the present exemplary embodiment, although the seat back 22 can be tilted backwards relative to the seat cushion 24, the seat back 22 may not be tilted backwards around these hinge portions 76. In other words, it is sufficient if the seat back 22 is only able to slide in the up-down direction.

Figure 9:
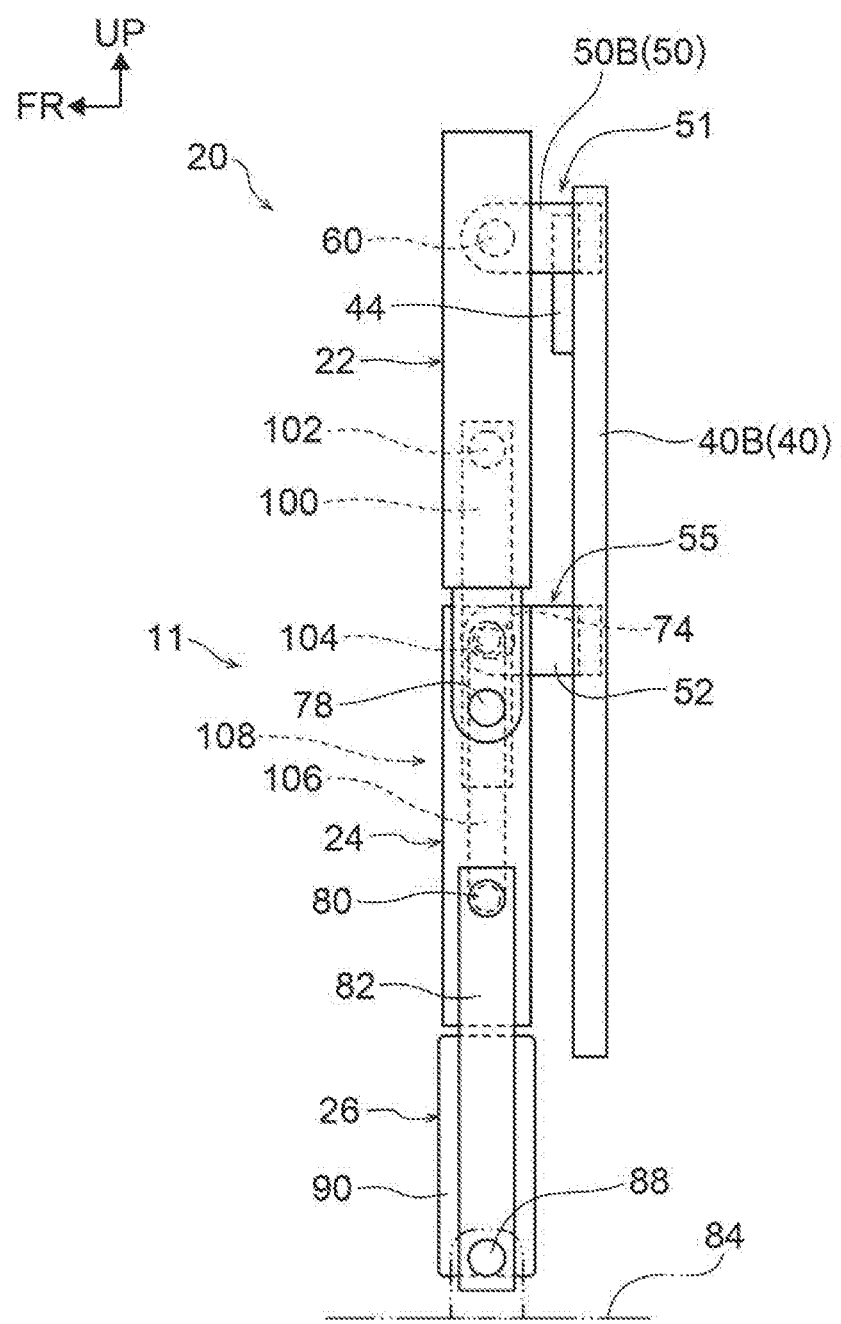
FIG. 9 is a side view corresponding to the retracted state illustrated in FIG. 6, in a variant example of a vehicle seat in which the vehicle seat structure according to an exemplary embodiment has been applied.
Figure 10:
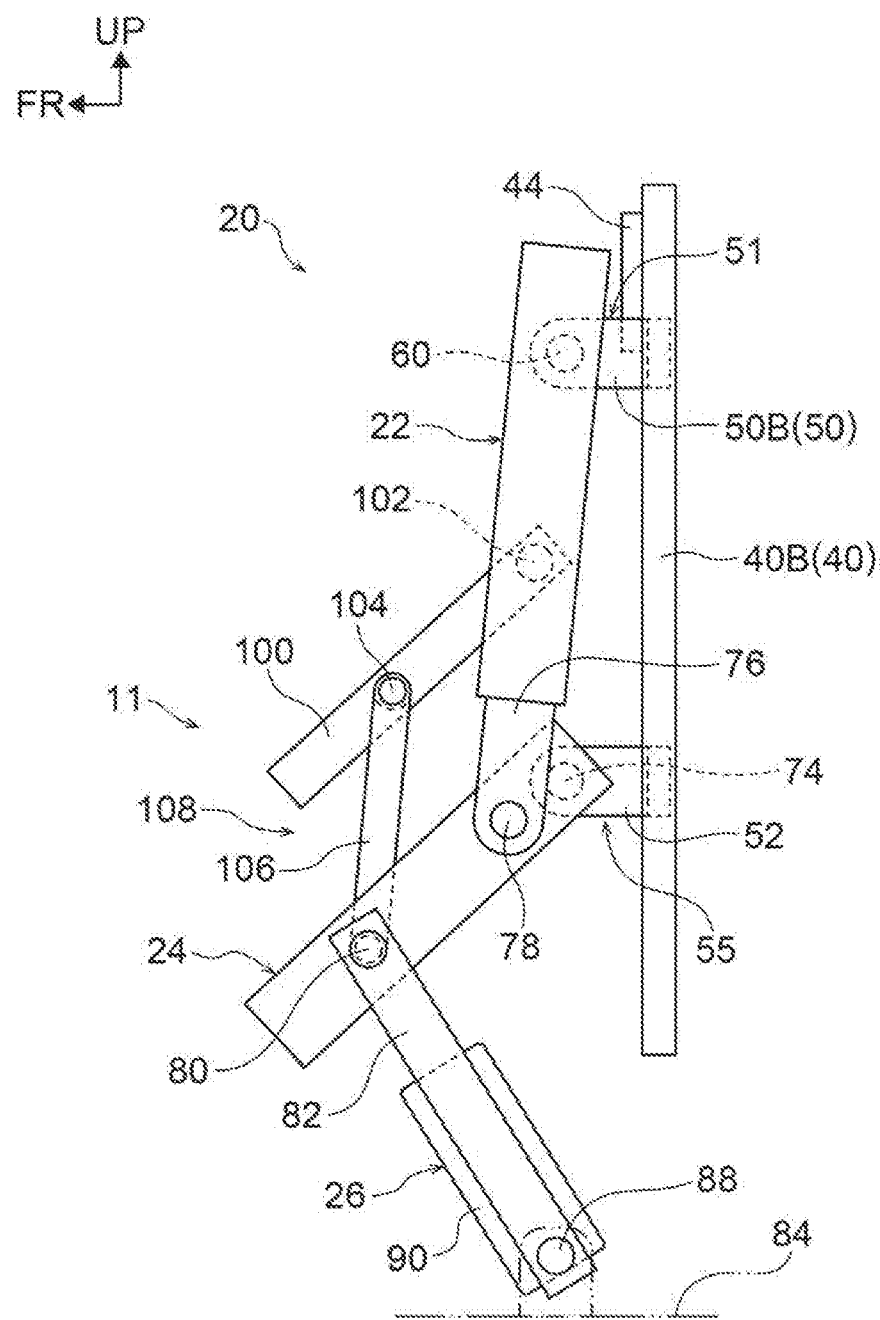
FIG. 10 is a side view corresponding to the state between the retracted state and the deployed state illustrated in FIG. 7, in a variant example of a vehicle seat in which the vehicle seat structure according to an exemplary embodiment has been applied.

In the above-described exemplary embodiment, in the seat illustrated in FIG. 6 through FIG. 8, an armrest 100 which is illustrated in FIG. 3 is not provided. In the following description, using FIG. 9 through FIG. 11, which correspond respectively to variant examples of the seat 20 illustrated in FIG. 6 through FIG. 8, a seat 20 in which the armrest 100 is provided will be described.

Figure 11:
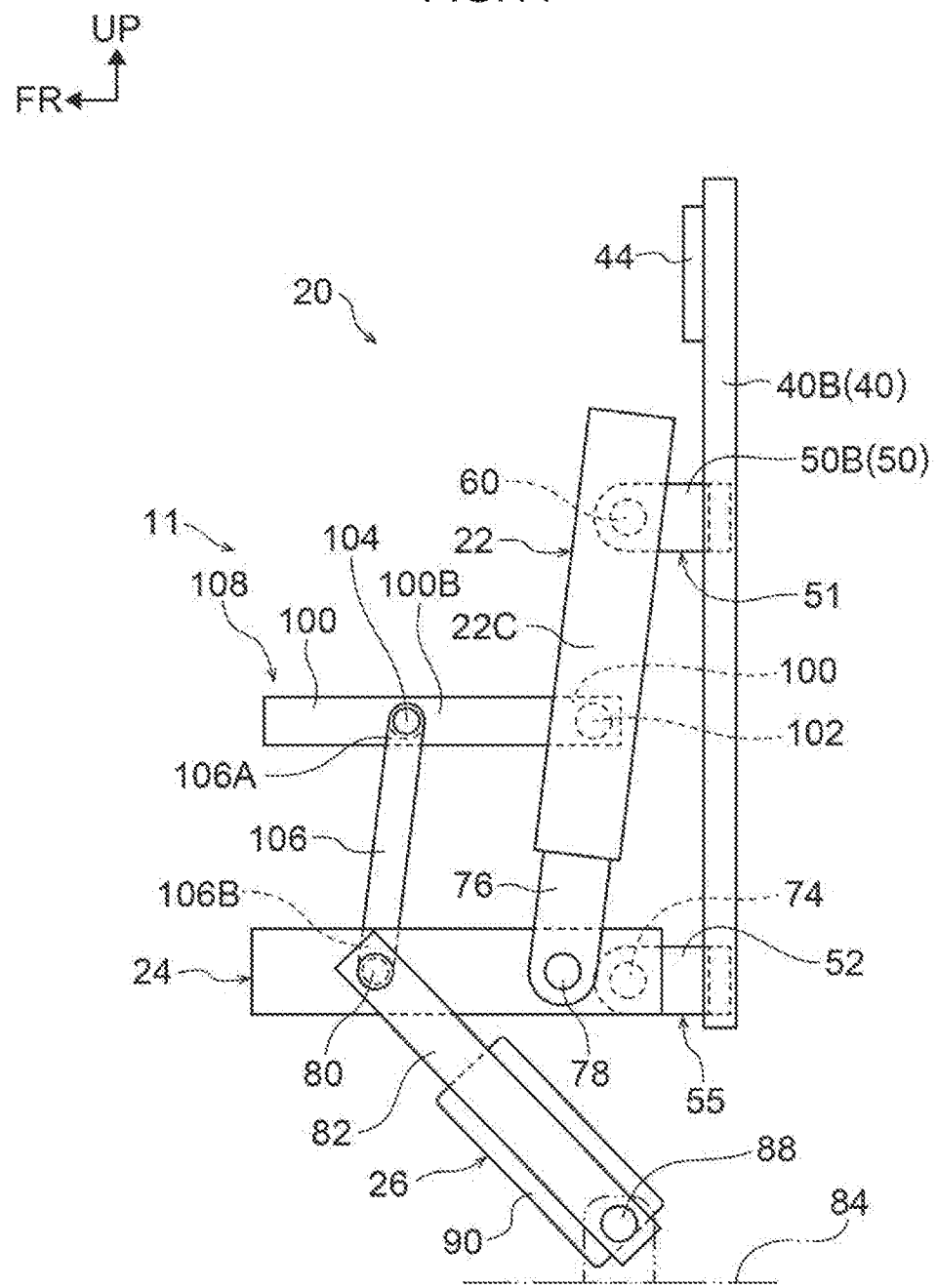
FIG. 11 is a side view corresponding to the deployed state illustrated in FIG. 8, in a variant example of a vehicle seat in which the vehicle seat structure according to an exemplary embodiment has been applied.

As is illustrated in FIG. 11, a shaft portion 102 whose axial direction extends in the seat width direction is provided in a central portion 22C in the vehicle up-down direction of the seat back 22 in the deployed state of the seat 20. One end portion 100A in the seat front-rear direction of the armrest 100 is pivotably attached to the shaft portion 102. In other words, the armrest 100 is able to pivot in the seat front-rear direction around the shaft portion 102.

In addition, a shaft portion 104 whose axial direction extends in the seat width direction is provided in a central portion 100B in the seat front-rear direction of the armrest 100. One end portion 106A in the vehicle up-down direction of a linking member 106 that links the armrest 100 to the seat cushion 24 is pivotably provided on this shaft portion 104, so that the linking member 106 pivotable in the seat front-rear direction around the shaft portion 104. Another end portion 106B in the vehicle up-down direction of the linking member 106 is attached to the shaft portion 80 provided in the seat cushion 24, so that the linking member 106 pivotable in the seat front-rear direction around this shaft portion 80.

As a result of this type of structure being employed, the armrest 100 is set up so as to fold down in conjunction with the deploying operation of the seat cushion 24, and so as to fold up in conjunction with the retracting operation of the seat cushion 24.

Here, a linking mechanism 108 is formed so as to include the armrest 100, the seat back 22, the seat cushion 24, and the linking member 106. When the seat 20 is deployed, the shape formed by these members forms a parallelogram that, when looked at in a seat side view, is tilted towards a rear side in the seat front-rear direction.

In other words, in the present exemplary embodiment, the shape formed by the members making up the linking mechanism 108 is different from when this shape forms a rectangle when looked at in a seat side view, and because the linking member 106 and the seat back 22 are not placed at the same dead center line, the armrest 100 may withstand a heavy load. As a consequence, any wobbling in the armrest 100 is inhibited and a vehicle occupant may lean on the armrest with confidence.

Moreover, this armrest 100 is convenient because it is folded down or folded up automatically in conjunction with an operation (i.e., an deploying operation or a retracting operation) of the seat cushion 24. However, naturally, it is also possible for the armrest 100 to be folded down or folded up manually. Additionally, in the present exemplary embodiment, the armrest 100 is provided on the right-hand side of each seat, however, the armrest 100 may instead be provided on the left-hand side or on both sides of each seat.

In some embodiments, provided that a heavy load can be supported by the seat cushion 24 itself, the seat cushion supporting member 26 may not be provided.

An exemplary embodiment of the present disclosure has been described above, however, exemplary embodiments of the present disclosure are not limited to this. Various modifications and the like may be made to the present disclosure insofar as they do not depart from the spirit or scope of the present disclosure.

What is claimed is:

1. A vehicle seat structure comprising:
    a seat cushion on which a vehicle occupant sits;
    a seat back that supports a back portion of the vehicle occupant while sitting on the seat cushion in a seat deployed state, the seat deployed state being a state in which the vehicle occupant is able to sit on the seat cushion;
    a seat deploying/retracting mechanism that enables the seat cushion and the seat back to slide in a vehicle up-down direction, and that, in a seat retracted state in which the seat cushion and the seat back are retracted, enables the seat cushion and the seat back to be placed in the vehicle up-down direction such that the seat cushion stands upright, and the seat back is placed at an upper side of the seat cushion; and
    a headrest that is exposed in the seat deployed state and the headrest is superimposed with the seat back in the seat retracted state.

2. The vehicle seat structure according to claim 1, wherein, in a case in which the seat back is slid towards a lower side in the vehicle up-down direction in the seat retracted state, the seat deploying/retracting mechanism places the vehicle seat structure in the seat deployed state by pivoting the seat cushion towards a front side in a seat front-rear direction so as to extend horizontally.

3. The vehicle seat structure according to claim 2, wherein the seat deploying/retracting mechanism includes:
    rails that extend in the vehicle up-down direction;
    a first supporting portion engaged with the rails, the first supporting portion supporting the seat back such that the seat back is slidable along the rails; and
    a second supporting portion engaged with the rails, the second supporting portion supporting the seat cushion such that the seat cushion slidable along the rails, and supporting the seat cushion such that the seat cushion pivotable in the seat front-rear direction with a pivoting axial direction extending in a seat width direction.

4. The vehicle seat structure according to claim 3, wherein:
    the first supporting portion supports the seat back such that the seat back pivotable in the seat front-rear direction with a pivoting axial direction extending in the seat width direction, and
    the seat deploying/retracting mechanism includes a hinge portion that enables the seat back and the seat cushion to pivot relatively in the seat front-rear direction with a pivoting axial direction in the seat width direction.

5. The vehicle seat structure according to claim 4, wherein a shaft of the hinge portion is disposed at a front side in the seat front-rear direction of a shaft of the second supporting portion.

6. The vehicle seat structure according to claim 3, wherein:
    one of the rails is provided respectively at each end side in the seat width direction of the seat back, the headrest supports a head portion of the seated vehicle occupant and the headrest is provided between the two rails.

7. The vehicle seat structure according to claim 1, wherein the seat deploying/retracting mechanism includes:
   an armrest that is linked to the seat back and forms a portion of a linking mechanism and that supports an arm portion of the seated vehicle occupant in the seat deployed state; and
   a linking member that forms a portion of the linking mechanism, and is linked to the armrest and the seat cushion, the linking member unfolding the armrest in conjunction with a deploying operation of the seat cushion, and folding up the armrest in conjunction with a retracting operation of the seat cushion.

8. The vehicle seat structure according to claim 7, wherein, in the seat deployed state, a shape formed by the armrest, the linking member, the seat cushion and the seat back forms a parallelogram that is tilted towards a rear side in the seat front-rear direction when seen from a seat side.

9. The vehicle seat structure according to claim 1, further comprising a seat cushion supporting member provided at a free-end side of the seat cushion, the seat cushion supporting member being pivotable in a seat front-rear direction with a pivoting axial direction extending in a seat width direction, and supporting the seat cushion in the seat deployed state in conjunction with a deploying operation and a retracting operation of the seat cushion.

10. The vehicle seat structure according to claim 3, further comprising a seat cushion supporting member provided at a free-end side of the seat cushion, the seat cushion supporting member being pivotable in the seat front-rear direction with a pivoting axial direction extending in the seat width direction, and supporting the seat cushion in the seat deployed state in conjunction with a deploying operation and a retracting operation of the seat cushion.

11. The vehicle seat structure according to claim 10, wherein a shaft of the seat cushion supporting member is disposed at the front side in the seat front-rear direction of a shaft of the second supporting portion.

\* \* \* \* \*

UNITED STATES PATENT AND TRADEMARK OFFICE
CERTIFICATE OF CORRECTION

PATENT NO. : 11,021,084 B2  
APPLICATION NO. : 16/668620  
DATED : June 1, 2021  
INVENTOR(S) : Hideyuki Sakurai Page 1 of 1

It is certified that error appears in the above-identified patent and that said Letters Patent is hereby corrected as shown below:

In the Specification

Column 8, Line 32, delete "SOB" and insert --50B--, therefor.

Column 8, Line 42, after "direction", insert --)--.

Column 14, Line 44, delete "up-don" and insert --up-down--, therefor.

Column 14, Line 66, delete "binge" and insert --hinge--, therefor.

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*